United States Patent [19]

Okamura et al.

[11] Patent Number: 5,545,933
[45] Date of Patent: Aug. 13, 1996

[54] ELECTRIC POWER STORAGE APPARATUS

[75] Inventors: Michio Okamura; Takeshi Morimoto; Kazuya Hiratsuka, all of Kanagawa-ken, Japan

[73] Assignees: Okamura Laboratory Inc., Yokohama; ELNA Company Ltd., Fujisawa; Asahi Glass Company Ltd., Tokyo, all of Japan

[21] Appl. No.: 312,871

[22] Filed: Sep. 27, 1994

[30] Foreign Application Priority Data

Sep. 28, 1993 [JP] Japan .................................. 5-264153
Sep. 28, 1993 [JP] Japan .................................. 5-264154

[51] Int. Cl.$^6$ .......................... G08B 21/00; H01G 5/019
[52] U.S. Cl. .......................... 307/109; 340/635; 361/300
[58] Field of Search .............................. 307/109, 49, 48, 307/50, 63, 69, 77; 361/300; 320/1, 18, 17, 48, 2; 340/635, 653, 636, 652; 324/434

[56] References Cited

U.S. PATENT DOCUMENTS

| | | | |
|---|---|---|---|
| 2,624,033 | 12/1952 | Jacquier | 320/18 |
| 4,020,243 | 4/1977 | Oldford | 340/636 |
| 4,719,401 | 1/1988 | Altmejd | 320/18 |
| 4,975,796 | 12/1990 | MacDougall | 320/1 |
| 5,063,340 | 11/1991 | Kalenowski | 320/18 |
| 5,206,578 | 4/1993 | Nor | 320/18 |
| 5,444,378 | 8/1995 | Rogers | 320/48 |

*Primary Examiner*—William M. Shoop, Jr.
*Assistant Examiner*—Richard T. Elms
*Attorney, Agent, or Firm*—Kanesaka & Takeuchi

[57] ABSTRACT

An electric power storage apparatus is formed of a plurality of series-connected cells to obtain a desired working voltage, each of the cells being constituted by one electric double-layer capacitor or a plurality of electric double-layer capacitors connected. The plurality of cells are series-connected so that the combined withstanding voltage is not lower than Vr+Vs where Vr represents the working voltage of the cells and Vs represents the withstanding voltage of one of the cells. The apparatus further includes connectors for detachably holding each of the cells respectively, and a circuit in which a diode is connected in parallel to each of the cells, so that a failed one of the cells can be detached and replaced by a new one while the working voltage of the cells is kept within a tolerance limit.

8 Claims, 4 Drawing Sheets

ELECTRIC POWER STORAGE APPARATUS

BACKGROUND OF THE INVENTION

RELATED APPLICATIONS

The present application relates to the following U.S. Patent Applications:

(1) Pending U.S. patent application Ser. No. 08/041,543 filed by Michio Okamura on Apr. 2, 1993;

(2) Pending U.S. patent application Ser. No. 08/249,120 filed by Michio Okamura on May 25, 1994;

(3) Pending U.S. patent application Ser. No. 08/266,460 filed by Michio Okamura, Takeshi Morimoto, and Kazuya Hiratsuka on Jun. 27, 1994; and (4) U.S. patent application Ser. No. 08/269,010 filed by Michio Okamura, Takeshi Morimoto, and Kazuya Hiratsuka on Jun. 30, 1994, now U.S. Pat. No. 5,498,951.

FIELD OF THE INVENTION

The present invention relates to an electric power storage apparatus provided with a cell group constituted by a plurality of cells which are series-connected to obtain a desired working voltage and each of which is constituted by a predetermined number of electric double-layer capacitors, and, more particularly, it relates to such an electric power storage apparatus in which a failed cell can be detached and replaced by a new cell while the working voltage of the cell group is kept within a tolerable limit.

DESCRIPTION OF THE RELATED ART

In a case of utilizing electric double-layer capacitors in an electric power storage apparatus which serves such as an electric power storage section, a combination of a large number of capacitor cells is used to increase the electric power capacity of the apparatus to thereby obtain a desired working voltage. The term "capacitor cell" used in this specification means a cell constituted by one electric double-layer capacitor or an arbitrary number of series- or parallel-connected electric double-layer capacitors, and, hereinafter, the terms "capacitor cell" will be called "cell" simply.

The inventor/inventors of the present invention have filed the above-mentioned U.S. patent application Ser. Nos. 08/041,543, 08/249,120, 08/26646 and 08/269,010 relating to a storage capacitor power supply constituted by electric double-layer capacitors and adapted, for example, to an electric car or the like.

In this kind of power supply, a large number of cells are connected to obtain a desired working voltage and a desired electric power capacity. Assume now that, for example, an electric power storage apparatus constituted by a combination of 1,000 cells is to be operated when the mean time between failures (MTBF) of one cell is 10,000 hours, that is, at the failure rate of about once per year, so that the MTBF of each cell must be maintained to be not smaller than 1,000×10,000=10,000,000 hours.

This is however a value which can be hardly achieved. Taking into account occurrence of a failure in a cell, how to replace the failed cell by a new one without cutting-off the electric power supply becomes a problem. Further, in the case of a capacitor, it is difficult to find out a failure thereof unless a serious situation such as liquid leakage, explosion, etc. is apparently caused. Particularly for the aforementioned type storage apparatus having a large number of connected cells, it is of urgent necessity to detect a failed cell speedily and accurately.

In this respect, there are some cases where a large number of storage batteries are connected for the purpose of preparation for power failure in an electric power equipment such as a power plant or in a telephone exchanger or the like. When this kind of apparatus breaks down, however, the apparatus must be isolated while the apparatus is repaired. Further, the conventional method of detecting a failed battery lacks not only in reliability because there is nothing but an estimation of the operating states of respective storage batteries from a voltage, a current, etc. in the condition in which the whole apparatus is assembled up, but also in speediness because a large time is required for identifying the position of the failed battery.

On the other hand, Japanese Unexamined Patent Publication No. 222427/1992 discloses a battery backup circuit utilizing electric double-layer capacitors. That is, in this backup circuit, an electric source circuit having an output capable of being switched over between a high voltage side and a low voltage side is connected to a battery, and backup electric double-layer capacitors are connected to the output side of the electric source circuit through a parallel circuit constituted by a high resistor and a switch for bypassing the high resistor. When the output voltage of the battery is lowered to a voltage level indicating battery exchange, the electric source circuit for the battery is switched to the high voltage output side and the switch is turned on to charge the electric double-layer capacitor rapidly and the electric double-layer capacitors supply a predetermined amount of electric power to a load while the battery is removed for replacement by a new one.

According to this prior art, the battery can be replaced by a new one without interruption of power supply of the power storage apparatus. However, the battery backup circuit requires an electric source circuit capable of being switched over between a high voltage output side and a low voltage output side and a parallel circuit constituted by a high resistor and a switch. The complexity of the circuit structure makes the cost of the apparatus undesirably high.

SUMMARY OF THE INVENTION

It is therefore a first object of the present invention to provide an electric power storage apparatus utilizing a combination of a plurality of cells each being constituted by a predetermined number of electric double-layer capacitors, and a failed cell can be detached and replaced by a new one by a simple structure without causing any system shutdown.

It is a second object of the present invention to provide an electric power storage apparatus utilizing a combination of a plurality of cells each being constituted by a predetermined number of electric double-layer capacitors, and a failure of any cell can be easily detected while the apparatus is in operation.

In order to achieve the foregoing first object, according to the present invention, the electric power storage apparatus comprises a plurality of cells series-connected to obtain a desired working voltage, each of the cells being constituted by one electric double-layer capacitor or a plurality of electric double-layer capacitors, wherein: the plurality of cells are series-connected so that the combined withstanding voltage is not lower than Vr+Vs where Vr represents the working voltage of the apparatus and Vs represents the withstanding voltage of at least one of the cells; and the apparatus further comprises connectors for detachably holding each of the cells respectively, and a circuit in which a diode is connected in parallel to each of the cells, so that a failed one of the cells can be detached and replaced by a new one while the working voltage of the apparatus is kept within a tolerable limit.

In this case, the plurality of cells may favorably be series-connected to set the combined withstanding voltage of the apparatus to Vr+Vs×n (in which n is a positive integer), so that n cells can be detached simultaneously while the working voltage is kept within a tolerable limit.

To achieve the foregoing second object, the apparatus according to the present invention further comprises circuits each of which is connected across terminals of corresponding one of the cells, and each of which is constituted by a series connection of a constant voltage source and a light-emitting diode, so that a failed one of the cells can be detected on the basis of the intensity of light emission of the light-emitting diodes. Preferably, each of the constant voltage sources is constituted by a zener diode.

Further to achieve the foregoing second object, the electric power storage apparatus according to the present invention further comprises a voltage detector, and a switching circuit for connecting both terminals of each of the cells successively one cell by one cell to the voltage detector so that the both terminals of each of the cells are connected successively one cell by one cell to the voltage detector through the switching circuit to compare a voltage between both terminals of each cell with a reference voltage set in the voltage detector to detect an abnormal voltage drop between the both terminals of each cell to thereby detect a failed one of the cells.

Preferably, in this case, a voltage between the both terminals of the same cell detected in the past is used as the reference voltage. More preferably, a voltage between the both terminals of the same cell detected in the last time is used as the reference voltage.

Further, to achieve the foregoing object, the electric power storage apparatus according to the present invention further comprises voltage comparators each of which is provided with a variable reference voltage source and connected successively between both terminals of corresponding one of the cells constituting the cell group, wherein each of the voltage comparators compares a voltage between both terminals of the corresponding one of the cells with a set reference voltage which is changed at predetermined time intervals to detect an abnormal voltage drop between both terminals of a cell to thereby detect a failed cell.

The features and advantages of the present invention will be understood well by reading following descriptions of preferred embodiments in connection with accompanying drawings.

DESCRIPTION OF THE PREFERRED EMBODIMENTS

Figure 1:
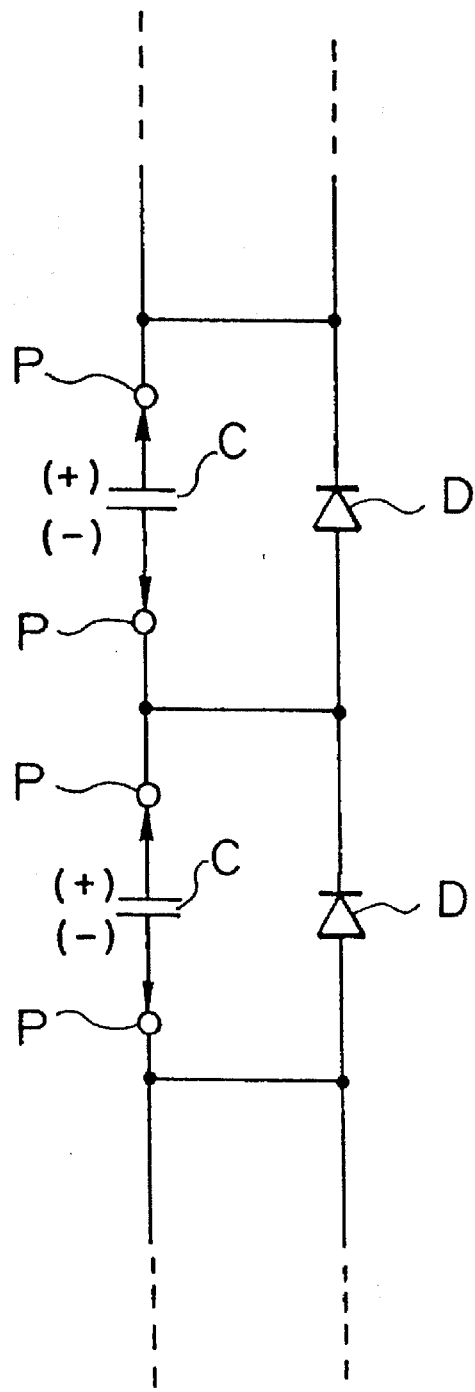
FIG. 1 is a schematic circuit diagram showing a first embodiment of the present invention.

Referring to FIG. 1, a first embodiment of the electric power storage apparatus according to the present invention will be described below. The electric power storage apparatus is provided with a plurality of cells C each of which may be constituted by parallel connection of an arbitrary number of electric double-layer capacitors (not shown). In this embodiment, the plurality of cells C are series-connected to form one cell group.

Although FIG. 1 shows only two cells C in the cell group for the sake of simplification, the number of cells C is selected properly so that the combined withstanding voltage of the cell group is set to be not lower than (100 V+3 V) on the assumption that the withstanding voltage of one cell C is, for example, 3 V when, for example, the apparatus is adapted to an electric power system in which it is essential that the working voltage of the cell group is kept 100 V. That is, because 103/3=34.3 . . . , at least 35 cells C are required.

In this electric power storage apparatus, in order to make any cell C detachable or replaceable in the condition in which the cells C are series-connected, each cell C is detachably or replaceably held by a pair of connectors P, and a diode D is connected to the above-mentioned pair of connectors P for each cell C so that the diode D is in parallel to the corresponding cell C. In this case, it is preferable that each diode D is constituted by a Schottky diode which can carry the calculated maximum output current of a cell with minimum forward voltage drop.

Accordingly, even if one cell C is broken down, the residual 34 cells C should hold 102 V so that there is no breakdown (power failure) of the system. Further, even in the case where the failed cell C is taken out of the corresponding pair of connectors P, the corresponding diode D stays still in the circuit so that the failed cell can be replaced by a new one while the electric power system is kept alive or hot.

Assuming that the number of serially connected cells C is 100, the time required to replace a capacitor is one hour, and the mean time between failures (MTBF) of the single capacitor is 10,000 hours, then the probability of a combined system failure that might occur during the replacement process of a broken capacitor will be (100*1/10,000=)1/100.

If the system is operable with the minimum of 99 cells of capacitor, 100 cells mean that there is only one redundancy. Under this design condition, the failure of the second cell while replacing the first one, triggers down the system.

In order to obtain a more reliable system, the number of capacitors can be increased to 101 which makes redundancy of two. This multiplies the probability of the failure by each redundant capacitor as (1/100)*(1/100)=1/10,000.

The same method may be applicable by connecting 102 cells to get the redundant margin of three. And the result would provide the greater improvement to the probability of the failure of 1/1,000,000.

On the other hand, in a case of a large-scaled system having a working voltage by an electric power storage apparatus thereof may reach 1,000 V, it is not impossible but troublesome that all electric double-layer capacitors are regarded as cells, respectively. In this case, for example, a combination of four series-connected cells each having a withstanding voltage of 3 V may be regarded and handled as one cell having a withstanding voltage of 12 V so that one diode can be allocated to the cell.

Further, in the case of insertion of a new cell C, it is preferable that the new cell C is charged before insertion with a voltage substantially equal to the voltage of each of the other cells operating normally at that time. Incidentally, if a new cell having no electric charge is inserted when each of the other cells is near a fully charged state (in which the cell is charged with a rated voltage or a working voltage selected at user's will), the new cell cannot operate until the system (the electric power storage apparatus) is charged next.

Figure 2:
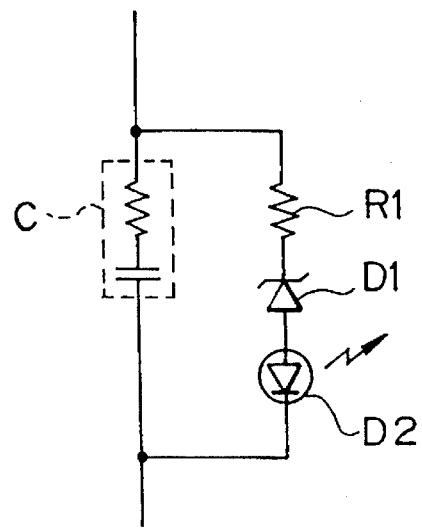
FIG. 2 is a schematic circuit diagram showing a second embodiment of the present invention.

In the following, a second embodiment of the present invention will be described with reference to FIG. 2. In the drawing, a cell C is the same as in FIG. 1 and a resistance in a block surrounded by broken lines represents the internal resistance of the cell. Although only one cell C is shown in FIG. 2, practically a large number of cells C are series-connected in the same manner as in the first embodiment.

In the second embodiment, a zener diode D1, a light-emitting diode D2 and a current limiting resistor R1 are series-connected between both terminals of each cell C. In this embodiment, when the voltage between both terminals of the cell C becomes lower than the zener voltage, the light-emitting diode D2 is put off. Accordingly, the operating states of the respective cells C inclusive of the residual electric charges of the respective cells C can be known easily by observations, so that this is very convenient for supervising the electric power storage apparatus utilizing such a large number of cells C in the active states. The zener diode used herein may be replaced by another constant voltage circuit or a constant voltage source such as a three-terminal shunt regulator, or the like.

Figure 3:
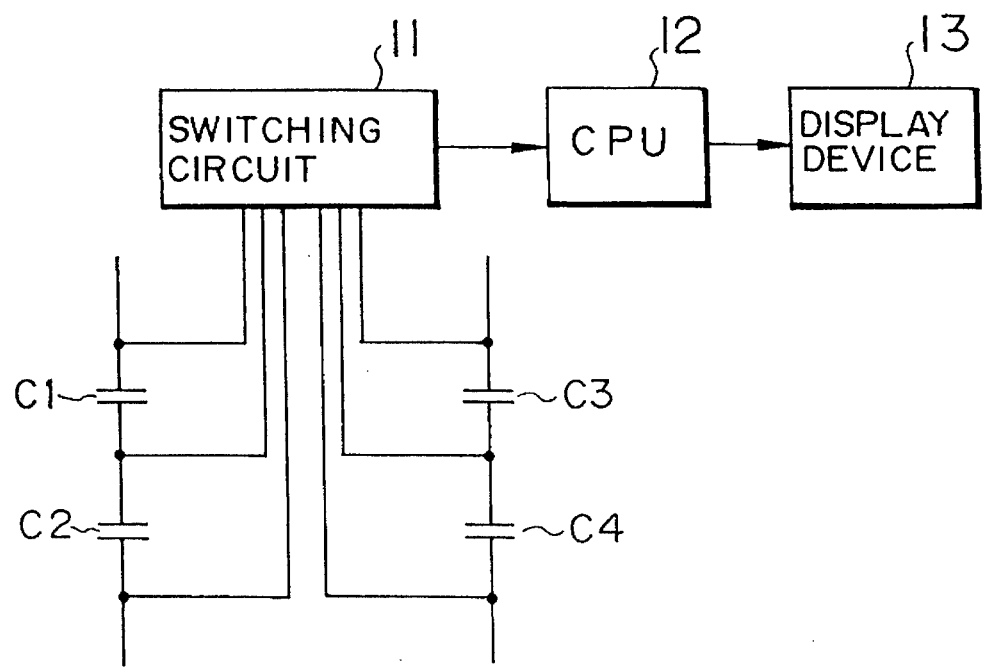
FIG. 3 is a schematic circuit diagram showing a third embodiment of the present invention.

FIG. 3 shows a third embodiment in which the operating states of the respective cells C are supervised. In the third embodiment, voltages between respective both terminals of a plurality of cells C1, C2 . . . are read out to a central processing unit (CPU) 12 successively at intervals of a predetermined time through a switching circuit 11 and compared with a reference voltage.

In this case, a voltage previously read out between both terminals of the same cell C is preferably used as a reference voltage. In this manner, the charge/discharge capability of each cell C can be judged very quantitatively. Results of the judgment or the like are indicated on a display device 13. The switching circuit 11 is, for example, constituted by a multiplexer or the like and, further, any known data collecting method may be applied as a data transmitting method, an isolation setting method, or the like.

Figure 4:
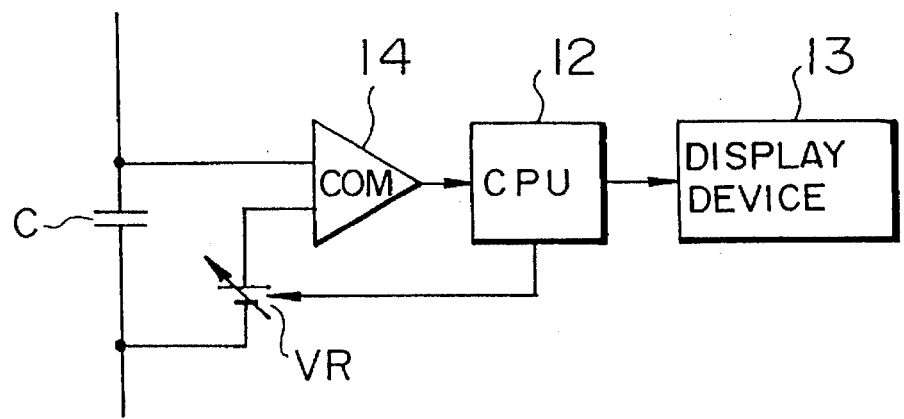
FIG. 4 is a schematic circuit diagram showing a fourth embodiment of the present invention.

FIG. 4 shows a fourth embodiment as a modified example of the third embodiment. In the fourth embodiment, voltage comparators 14 are used. Each voltage comparator 14 is connected across both terminals of the corresponding cell C. Each voltage comparator 14 is provided with a variable reference voltage source VR inserted between the voltage comparator 14 and the one terminal of the cell C.

The reference voltage Vref in the variable reference voltage source VR is changed suitably, for example, in accordance with an instruction from the CPU 12.

Taking as an example the case where a cell is discharged from a fully charged state (in which the cell is charged with a rated voltage or a working voltage selected at user's will), first the reference voltage Vref is set to a value lower by $\Delta V$ than the voltage in the fully charged state, and the time t until the voltage comparator 14 operates after start of discharge is examined.

Figure 5:
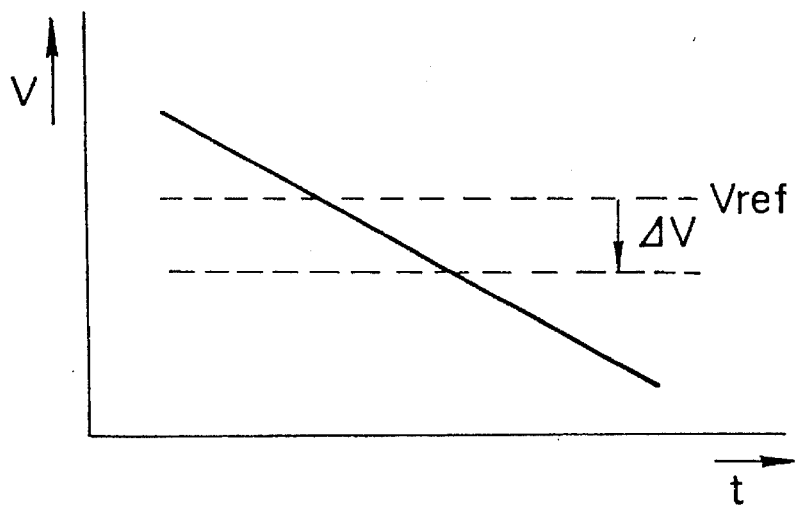
FIG. 5 is a graph for explaining the comparing operation of a voltage comparator in the fourth embodiment.

As shown in FIG. 5, the reference voltage Vref is reduced by $\Delta V$ at intervals of the predetermined time t so that the output of the voltage comparator 14 is supervised by the CPU 12. In a case where the voltage comparator 14 operates abnormally early, this means an abnormal lowering of the electric charge of the cell C. On the contrary, in a case where the voltage comparator 14 operates abnormally late, a decision is made that a failure has occurred in connection or the like if all the cells have been fully charged at the beginning.

Figure 6:
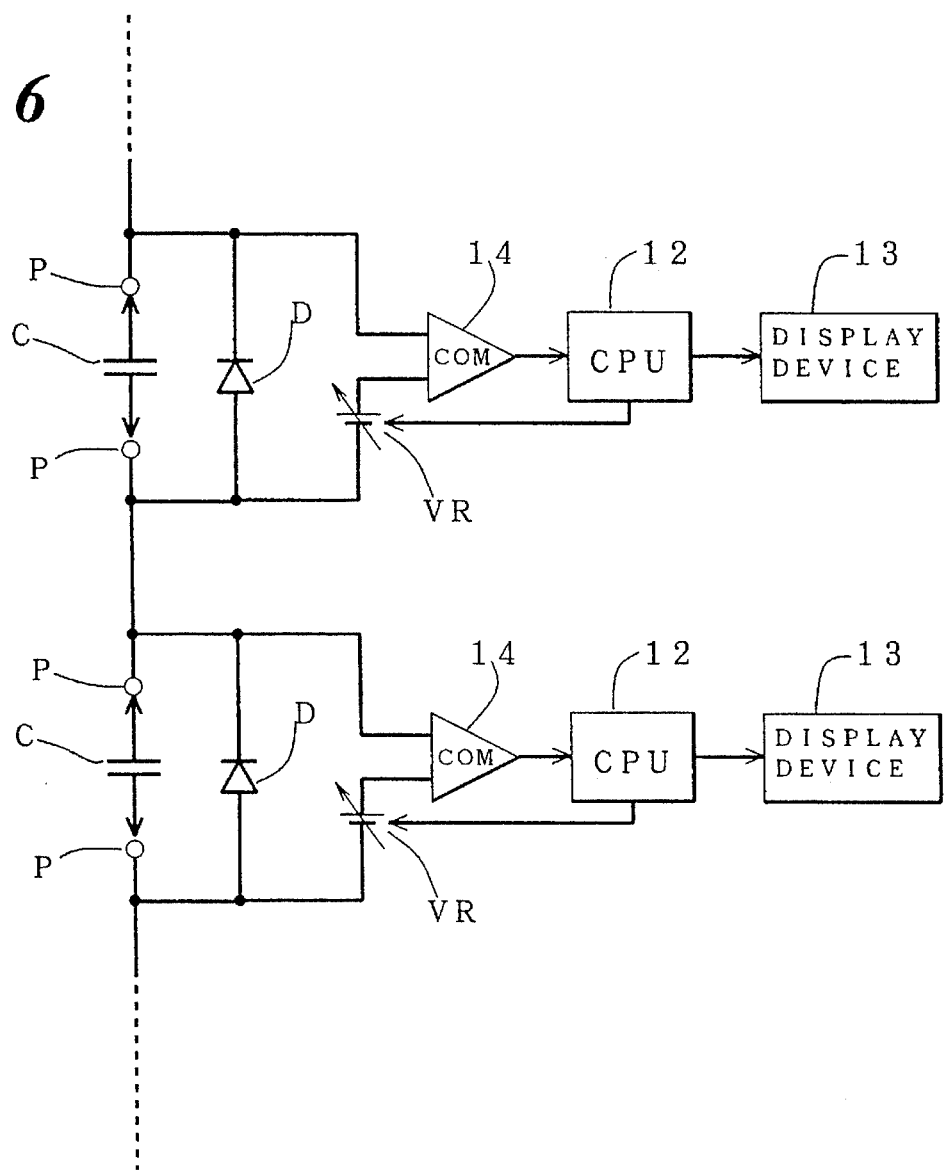
FIG. 6 is a schematic circuit diagram showing a modified fourth embodiment of the present invention.

FIG. 6 shows a circuit containing a plurality of voltage comparators 14 as shown in FIG. 4, wherein the circuit includes the diodes D and connectors P as shown in FIG. 1 in addition to that shown in FIG. 4.

Accordingly, when the electric power storage apparatus is charged, the reference voltage Vref is increased by $\Delta V$ at intervals of the predetermined time.

Although the embodiments of the present invention have been described above, it is a matter of course that the invention is not limited thereto and that an electric power storage apparatus formed by combining the embodiment of FIG. 1 and any one of the embodiments of FIGS. 2 to 5 and other modified examples derived from the scope of claim are contained in the scope of the invention.

We claim:

1. An electric power storage apparatus for providing a predetermined working voltage, comprising:

a plurality of cells connected in series to form a power line, each of said cells being formed of at least one electric double-layer capacitor, said plurality of said cells connected in series having a combined withstanding voltage not lower than Vr+Vs, wherein Vr represents said predetermined working voltage of said apparatus and Vs represents a withstanding voltage of at least one cell, connectors attached to the line for detachably holding each of said cells so that the cells can be attached to and detached from the line, and a plurality of diodes, each being connected parallel to each cell so that when one of the cells situated parallel to one of the diodes breaks down, electricity passes through said one of the diodes to allow the apparatus to hold at least the predetermined working voltage of Vr and to allow the broken down cell to be replaced with a new cell without shutdown of the apparatus.

2. An electric power storage apparatus according to claim 1, wherein said withstanding voltage of Vs has a capacity for covering some of said cells so that said some of the cells corresponding to the withstanding voltage of Vs can be replaced simultaneously.

3. An electric power storage apparatus according to claim 1, further comprising constant voltage sources, each being connected in series to each of the diodes and parallel to one of the cells, said diode being a light-emitting diode so that when the cells break down, said light-emitting diodes indicate conditions of the cells.

4. An electric power storage apparatus according to claim 3, wherein said constant voltage sources are zener diodes.

5. An electric power storage apparatus according to claim 1 further comprising a voltage detector, and a switching circuit connected to the voltage detector, said switching circuit having a plurality of connection lines connected to both terminals of each of the cells, said switching circuit successively connecting two of the connection lines for said both terminals of each of the cells to the voltage detector so that the voltage detector compares a voltage at said both terminals of each of the cells with a reference voltage set in the voltage detector to detect an abnormal voltage drop to detect a failed cell.

6. An electric power storage apparatus according to claim 5, wherein said voltage detector is a CPU having a memory to memorize voltages of the respective cells, said voltages being used as reference voltages for a following comparison of the respective cells.

7. An electric power storage apparatus according to claim 1, further comprising voltage comparators, each being connected to both terminals of each of the cells and having a variable reference voltage source, each comparator comparing successively a voltage between the both terminals of the cell with a set reference voltage changed at a predetermined time interval to detect an abnormal voltage drop between the both terminals to detect a failed cell.

8. An electric power storage apparatus according to claim 1, wherein said each cell is formed of a plurality of electric double-layer capacitors connected together to form one cell unit.

* * * * *